(12) United States Patent
Gusman et al.

(10) Patent No.: US 12,344,372 B2
(45) Date of Patent: Jul. 1, 2025

(54) VARIABLE NOISE REDUCTION SYSTEMS FOR SUPERSONIC AIRCRAFT, AND ASSOCIATED METHODS

(71) Applicant: Boom Technology, Inc., Centennial, CO (US)

(72) Inventors: Marshall Gusman, Centennial, CO (US); Benjamin Clemen Murphy, Denver, CO (US); Allison Pelzel, Fort Lupton, CO (US); Joseph A. Salamone, III, Centennial, CO (US)

(73) Assignee: Boom Technology, Inc., Centennial, CO (US)

( * ) Notice: Subject to any disclaimer, the term of this patent is extended or adjusted under 35 U.S.C. 154(b) by 288 days.

(21) Appl. No.: 17/890,973

(22) Filed: Aug. 18, 2022

(65) Prior Publication Data

US 2023/0056909 A1 Feb. 23, 2023

Related U.S. Application Data

(60) Provisional application No. 63/235,066, filed on Aug. 19, 2021.

(51) Int. Cl.
*B64C 30/00* (2006.01)
*B64C 13/16* (2006.01)
*B64D 31/06* (2024.01)

(52) U.S. Cl.
CPC .............. *B64C 30/00* (2013.01); *B64C 13/16* (2013.01); *B64D 31/06* (2013.01); *B64C 2220/00* (2013.01)

(58) Field of Classification Search
CPC ..... B64C 30/00; B64C 13/16; B64C 2220/00; B64D 31/06
See application file for complete search history.

(56) References Cited

U.S. PATENT DOCUMENTS 5,348,256 A * 9/1994 Parikh .................. B64D 15/04
D12/333
5,529,263 A 6/1996 Rudolph
(Continued)

FOREIGN PATENT DOCUMENTS

WO 2005065071 7/2005

OTHER PUBLICATIONS

International Search Report and Written Opinion for International Patent Application No. PCT/US22/40801, Applicant: Boom Technology, Inc., mailed Dec. 22, 2022, 12 pages.
(Continued)

*Primary Examiner* — Sahar Motazedi
(74) *Attorney, Agent, or Firm* — Perkins Coie LLP

(57) ABSTRACT

Systems and methods according to embodiments of the present technology vary engine throttle and flight control surfaces (such as high-lift devices, which can include flaps and/or slats) during takeoff, climb, approach, and/or landing of a supersonic aircraft to reduce noise. A representative computing device automatically controls thrust output of the propulsion system according to a schedule of thrust output, such that the thrust output remains below levels at which the jet exhaust becomes supersonic, and such that noise is reduced to comply with noise regulations or other limitations. The computing device also automatically controls the position and configuration of flight control surfaces to compensate for the reduced thrust and to maintain an appropriate climb and/or descent rate.

18 Claims, 7 Drawing Sheets

(56) References Cited

U.S. PATENT DOCUMENTS

| | | | |
|---|---|---|---|
| 6,161,797 | A | 12/2000 | Kirk et al. |
| 6,880,784 | B1 | 4/2005 | Wilkinson et al. |
| 8,356,776 | B2 | 1/2013 | Berens et al. |
| 9,656,741 | B2 | 5/2017 | Moser et al. |
| 2009/0314897 | A1* | 12/2009 | Boissenin ............... B64C 19/02 244/186 |
| 2020/0025109 | A1 | 1/2020 | Stieger et al. |
| 2021/0139156 | A1* | 5/2021 | Hamel ...................... F02C 9/28 |

OTHER PUBLICATIONS

Berton et al., "Supersonic Technology Concept Aeroplanes for Environmental Studies," AAIA SciTech Forum and Exposition, Orlando, Florida Jan. 6-10, 2020, 19 pages.

Website: "Estimation of Cumulative Noise Reduction at Certification Points for Supersonic Civil Aeroplane Using the Programmed Thrust Management at Take-off and Approach," • https://www.intechopen.com/online-first/estimation-of-cumulative-noise-reduction-at-certification-points-for-supersonic-civil-aeroplane-usin, submitted Oct. 14, 2020, 18 pages.

Thomas et al., "Systems Analysis of Community Noise Impacts of Advanced Flight Procedures for Conventional and Hybrid Electric Aircraft," MIT International Center for Air Transportation, Jun. 2020, 223 pages.

Website: Giacomelli et al., "Optimization of High lift device system deployment for takeoff performance," https://www.esteco.com/modefrontier/optimization-high-lift-device-system-deployment-takeoff-performance, Jun. 12, 2017, 2 pages.

Website: "Airbus concludes ATTOL with fully autonomous flight tests," https://www.airbus.com/newsroom/press-releases/en/2020/06/airbus-concludes-attol-with-fully-autonomous-flight-tests.html, Jun. 29, 2020, 2 pages.

Thesis, MSc., "Design and Noise Acceptability of Future Supersonic Transport Aircraft," Delft University of Technology, Dec. 2020, 136 pages.

Lockard et al., "The Airframe Noise Reduction Challenge," NASA, Apr. 2004, 31 pages.

* cited by examiner

| Schedule of Takeoff Settings for Location X | | | | |
|---|---|---|---|---|
| Altitude, ground speed, and/or airspeed | Slats | Flaps | Other Control Surfaces | Throttle |
| Value a | Value b | Value c | Value d | Value e |
| Value a1 | Value b1 | Value c1 | Value d1 | Value e1 |
| Schedule of Approach Settings for Location X | | | | |
| Altitude and/or airspeed | Slats | Flaps | Other Control Surfaces | Throttle |
| Value f | Value g | Value h | Value i | Value j |
| Value f1 | Value g1 | Value h1 | Value i1 | Value j1 |

*FIG. 7*

VARIABLE NOISE REDUCTION SYSTEMS FOR SUPERSONIC AIRCRAFT, AND ASSOCIATED METHODS

CROSS-REFERENCE TO RELATED APPLICATION

The present application claims priority to U.S. Provisional Patent Application No. 63/235,066, filed Aug. 19, 2021, which is incorporated herein by reference in its entirety.

TECHNICAL FIELD

The present technology is directed generally to commercial supersonic aircraft, and associated systems and methods.

BACKGROUND

Supersonic aircraft have been used primarily for military missions since the mid-1900s. Then, in the 1970s, the United States and Europe each developed commercial supersonic aircraft: the supersonic transport, or "SST" in the United States, and the Concorde in Europe. The Concorde went on to fly commercial passengers on transatlantic routes through the 1990s. However, in light of the Concorde's retirement in 2003, there remains a need in the industry for a viable and profitable supersonic commercial aircraft.

One challenge to the viability of supersonic commercial aircraft is the environmental noise of the aircraft, specifically during take-off, climb, and landing (e.g., during approach). Existing regulations that limit the allowable noise output of an aircraft on take-off and landing are designed for subsonic aircraft. Supersonic aircraft, however, have significantly more powerful engines that may produce noise that could exceed the noise limits for existing regulations. Another challenge to operating aircraft (including supersonic aircraft) is that regulations limit the amount of human control during takeoff for noise certification reference flight procedures. Generally, according to those procedures, the only permissible human-initiated adjustment to aircraft configurations during takeoff is gear retraction. It would be advantageous to enable supersonic commercial aircraft operators to automatically reduce the noise output of supersonic commercial aircraft to comply with noise regulations and to comply with the regulations associated with minimizing human-initiated configuration changes during takeoff for the reference flight procedures.

BRIEF DESCRIPTION OF THE DRAWINGS

In the drawings, wherein the same reference number indicates the same element throughout the several views:

FIG. 7 illustrates a schedule of settings configured in accordance with representative embodiments of the present technology.

Figure 1:
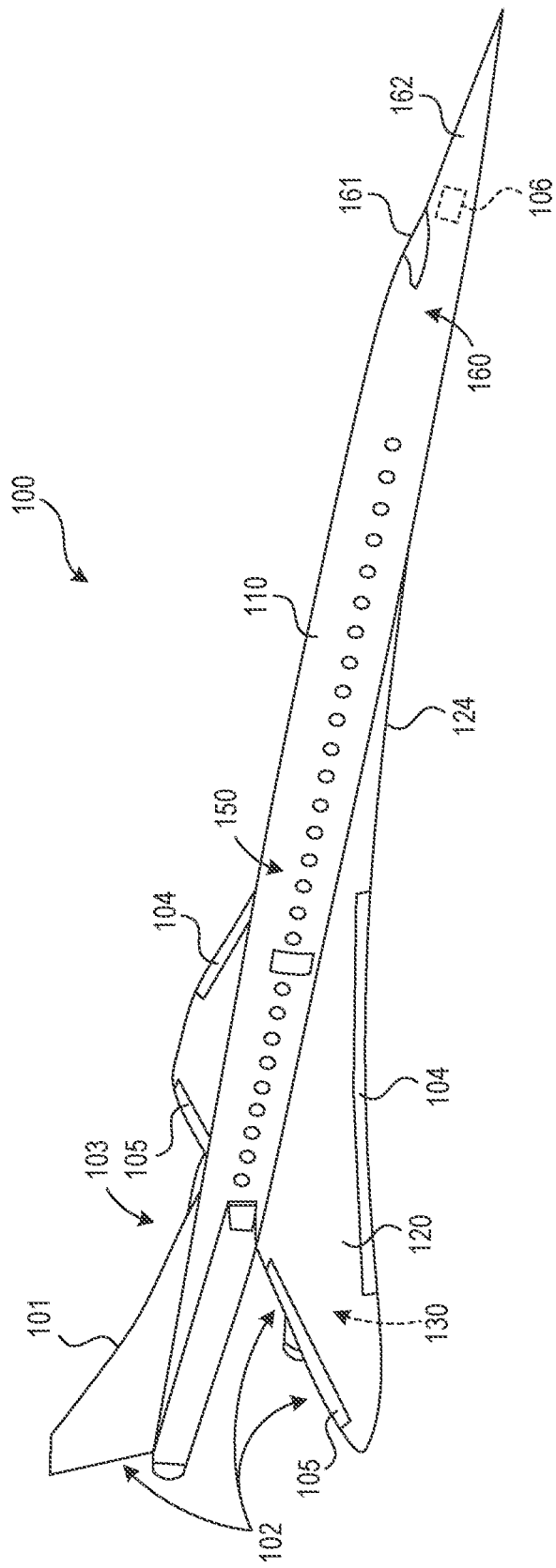
FIG. 1 is a partially schematic, isometric illustration of a representative commercial supersonic aircraft in which variable noise reduction systems configured in accordance with embodiments of the present technology can operate.

In the present disclosure, the figures have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in greater detail below. The intention, however, is not to limit the technology to the particular implementations described. On the contrary, the technology is intended to cover all suitable modifications, equivalents, and alternatives.

DETAILED DESCRIPTION

Systems that automatically vary engine throttle and flight control surfaces (such as high-lift devices, which can include flaps and/or slats) during takeoff, climb, approach, and/or landing of a supersonic aircraft to reduce (e.g., minimize) aircraft and engine noise are described within, along with associated methods. Such systems may be referred to as "variable noise reduction systems." An aerospace system can include a supersonic aircraft and a variable noise reduction system configured in accordance with embodiments of the present technology. A representative computing device (e.g., a controller) can automatically control the thrust output of the propulsion system of the aircraft according to a schedule of thrust output, such that the thrust output remains below levels at which the jet exhaust becomes supersonic, and such that noise is reduced (e.g., minimized) to comply with noise regulations and/or other limitations. For purposes of the present disclosure, whether the jet exhaust is subsonic or supersonic during acceleration and takeoff of the aircraft is defined by whether the fully expanded mean jet exhaust is subsonic or supersonic. Embodiments of the computing device (controller) can also automatically control the position and configuration of flight control surfaces, such as the slats and/or the flaps of the aircraft, to compensate for the reduced thrust output and to maintain an appropriate climb rate and/or descent rate, according to a schedule of flight control surface positions. The schedule of thrust, slat position, flap position, and/or positions of other flight control surfaces can be predetermined based on testing aircraft at various airport locations and in various conditions with a focus on reducing (e.g., minimizing) takeoff noise and/or landing noise.

Various implementations of the systems will now be described. The following description provides specific details for a thorough understanding and an enabling description of these implementations. One skilled in the art will understand, however, that the systems can be practiced without many of these details and/or with alternative approaches. Additionally, some well-known structures or functions (such as structures or functions associated with flight control surfaces) may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the systems.

Suitable Environments

FIG. 1 and the following discussion provide a brief, general description of a suitable environment in which representative variable noise reduction systems can be implemented. Although not required, aspects of the systems are described in the general context of computer-executable instructions, such as routines executed by a general purpose computer, a personal computer, a server, and/or other computing system. The systems can also be embodied in a special purpose computer or data processor that is specifically programmed, configured, and/or constructed to perform one or more of the computer-executable instructions explained in detail herein, e.g., an automated flight deck based controller. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), field-programmable gate arrays (FPGAs) or the like, and/or any suitable combination of such devices. Computer-executable instructions may be stored in memory, such as random access memory (RAM), read-only memory (ROM), flash memory, or the like, and/or any suitable combination of such components. Computer-executable instructions may also be stored in one or more storage devices, such as magnetic or optical-based disks, flash memory devices, and/or any other suitable type of non-volatile storage medium or non-transitory medium for data. Computer-executable instructions may include one or more program modules, which can include routines, programs, objects, components, data structures, and so on that perform particular tasks and/or implement particular abstract data types. Information handled by these computing systems can be presented at any suitable display medium, including a CRT display or LCD.

Aspects of the variable noise reduction systems can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the systems described herein may be stored or distributed on tangible, non-transitory computer-readable media, including magnetic and optically readable and removable computer discs, or stored in firmware in chips (e.g., EEPROM chips). Alternatively, aspects of the systems may be distributed electronically over the Internet or over other networks (including wireless networks). That is, aspects of the variable noise reduction systems can be executed by computing systems within a supersonic commercial aircraft, by computing systems located on the ground (e.g., at a ground-based controller), or in combinations of the two (e.g., aircraft-based and ground-based computing systems, in communication with each other, implementing aspects of the variable noise reduction systems). Those skilled in the relevant art will recognize that portions of the systems may reside on a server computer, while corresponding portions reside on a client computer. Data structures and transmission of data particular to aspects of the systems are also encompassed within the scope of the systems.

FIG. 1 is a partially schematic, isometric illustration of a representative supersonic commercial aircraft 100 configured in accordance with embodiments of the present technology. The aircraft 100 includes a fuselage 110, which houses a passenger cabin 150 and flight deck 160. The passenger cabin 150 can be configured to carry any suitable number of passengers. For example, in a particular embodiment, the cabin 150 can be configured to carry about 65 revenue-generating passengers. In other example embodiments, the cabin 150 can have a maximum capacity from 50-100 passengers (e.g., 88 passengers). The foregoing ranges refer to upright passenger seats. In other embodiments, the cabin 150 can include lay-flat seats and/or upright seats. For example, the cabin 150 can include 20 lay-flat seats in an all-business class, low density configuration. In other embodiments, the cabin 150 can include a mix of lay-flat seats (e.g., less than 20) and upright seats. This capacity is distinguished from a non-commercial supersonic aircraft (e.g., a military or training aircraft), and is roughly equivalent to the business class capacity of a typical trans-oceanic, subsonic commercial aircraft. The convenience of reduced travel time provided by the aircraft 100 is expected to more than offset the likely reduction in space available to each passenger within the cabin 150, when compared with business class seats. Accordingly, for at least this reason, it is expected that embodiments of the aircraft 100 can be profitable to operate by carrying passengers paying a ticket price competitive with that of a subsonic business class passenger seat.

The aircraft 100 can include a supersonic wing 120, for example, a highly-swept delta-wing configuration to provide suitable lift at supersonic cruise conditions, as well as subsonic takeoff and landing conditions. In a particular embodiment, the wing 120 has a shape that is the same as or generally similar to existing NACA airfoils. A vertical stabilizer 101 (e.g., carried by an empennage 103 of the aircraft 100), as well as suitable flight control surfaces 102 carried by the wing 120 and/or the vertical stabilizer 101 (e.g., a rudder), provide for aircraft stability and control. The aircraft 100 can further include a chine 124 that extends forward of the main portion of the wing 120, along the fuselage 110. The flight control surfaces 102 can include slats 104 on the leading edge(s) of the wing 120, flaps 105 on the trailing edge(s) of the wing 120, and/or other flight control surfaces 102 (e.g., elevators, stabilizers, and/or elevons) suitable for aerodynamically controlling an aircraft during takeoff, climb, flight, approach, landing, and/or other activities. The slats 104 and flaps 105 are configurable (e.g., selectively deployable and/or adjustable) high-lift devices configured to reduce the stalling speed of the aircraft 100 (for example, by extending a surface area of the wing 120). Persons of ordinary skill in the art will understand flaps, slats, various other flight control surfaces, and their effects on aerodynamics and flight.

Aspects of a control system 106 operate automatically, autonomously, and/or under the direct control of pilots seated at the flight deck 160, which is positioned toward the nose 162 of the aircraft 100. In some embodiments, the control system 106 can include computing devices and/or some or all of the components of a variable noise reduction system disclosed herein. The nose 162 can have a sharp configuration, suitable for efficient cruise operation at supersonic speeds. A corresponding flight deck windshield 161 can be highly integrated into the sharp, conical contour of the nose 162. The flight deck 160 may be outfitted with synthetic vision systems to provide additional visibility to the pilots, particularly during takeoff, climb-out, approach, and/or landing, when the angle of attack of the aircraft 100 may be sufficiently high to prevent or impede the pilots' normal visual access in the forward direction. Suitable synthetic vision systems can present camera-based images that, in particular embodiments, are software-enhanced.

A supersonic aircraft is an aircraft that is capable of flying faster than the speed of sound (Mach 1). Accordingly, the aircraft 100 includes a propulsion system 130 configured to power the aircraft efficiently at supersonic speeds (e.g., in a range from Mach 1.6 to Mach 2.4, and in some embodiments, Mach 1.7, or other suitable speeds between Mach 1 and Mach 3, or greater) during cruise, while also providing reasonably efficient subsonic performance during takeoff, climb-out, subsonic cruise, descent, approach, and/or landing. In a particular embodiment, the propulsion system 130 includes two wing-mounted nacelles, each of which supports a corresponding wing-mounted engine. Additional embodiments of the aircraft 100 may include configurations with four engines, fuselage-mounted engines, etc. The propulsion system 130 is throttleable (by a pilot or a control system) to increase or reduce thrust, depending on flight needs.

Figure 2:
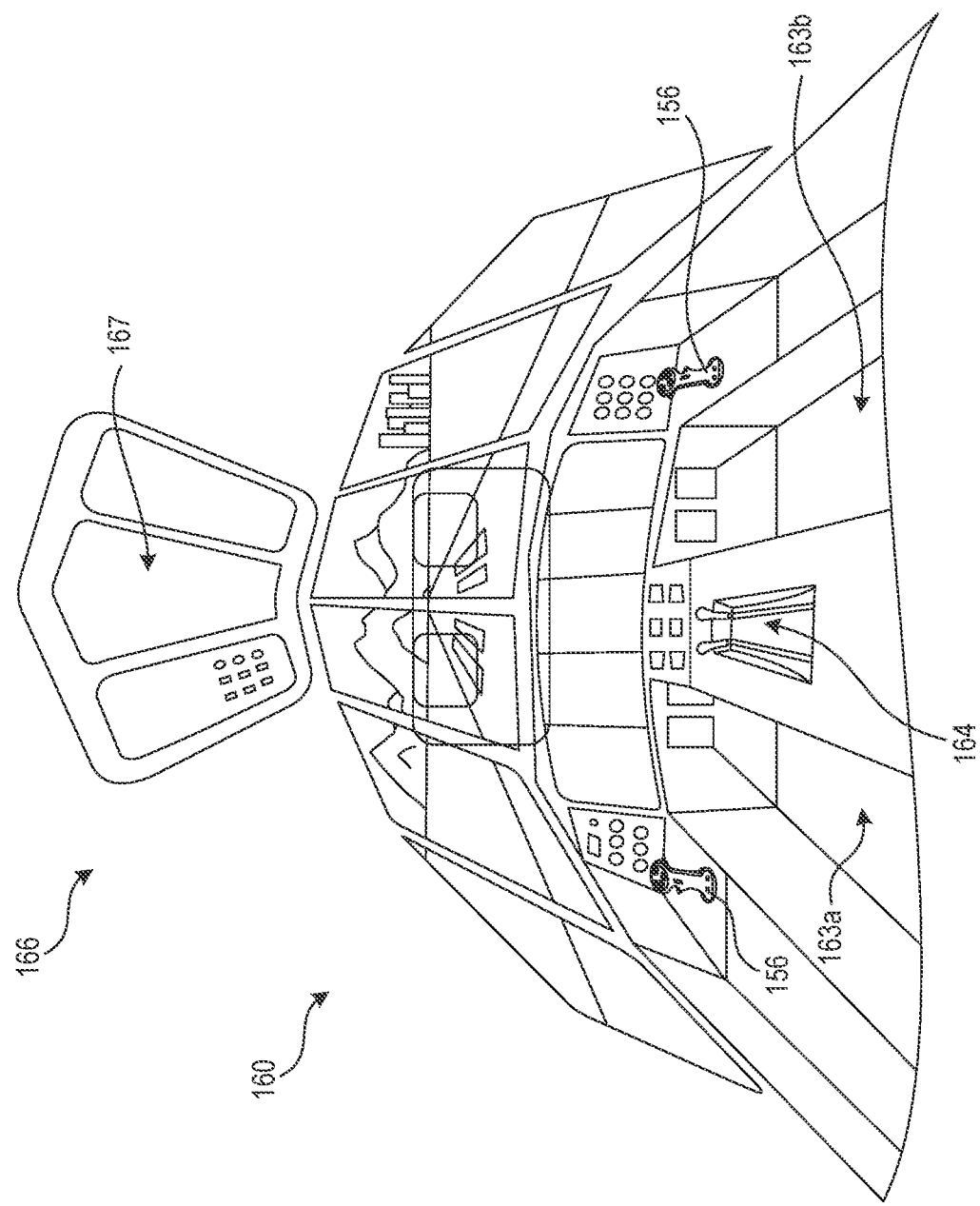
FIG. 2 is a partially schematic illustration of a representative flight deck in a supersonic aircraft in which the variable noise reduction systems can operate.

FIG. 2 is a partially schematic, isometric illustration of a representative flight deck 160 configured in accordance with embodiments of the present technology. The flight deck 160 includes crew seats 163, including a pilot seat 163a and a first officer seat 163b. The pilot and first officer each have access to a corresponding side stick 156 to control the aircraft flight direction. The side stick 156 can operate as a joystick during flight, and can be twisted for steering on the ground, and can be connected both digitally and mechanically, so that if one side stick 156 is moved, the other moves correspondingly. The flight deck 160 can further include a digital throttle, nozzle and inlet control 164 (hereinafter referred to as a throttle 164), e.g., with a single lever per engine, a single lever for all engines, or a single lever per engine with the levers linkable to one another to control the engines simultaneously or independently. Although the throttle 164 can be a physical lever, in some embodiments, the throttle 164 may be a virtual throttle such that it includes an on-screen controller such as a slider in a graphical user interface. An overhead panel 167 can include control input and output elements. The flight deck 160 is further outfitted with one or more displays 166, for example, one or more flat panel touch displays, one or more heads-up displays, and/or one or more pop-up displays. The displays 166 can present information from the synthetic vision system described above and/or other information associated with the aircraft 100. In some embodiments of the variable noise reduction system, the system can present status information (e.g., thrust level information and/or flight control surface configuration information) on one or more of the displays 166.

Figure 3:
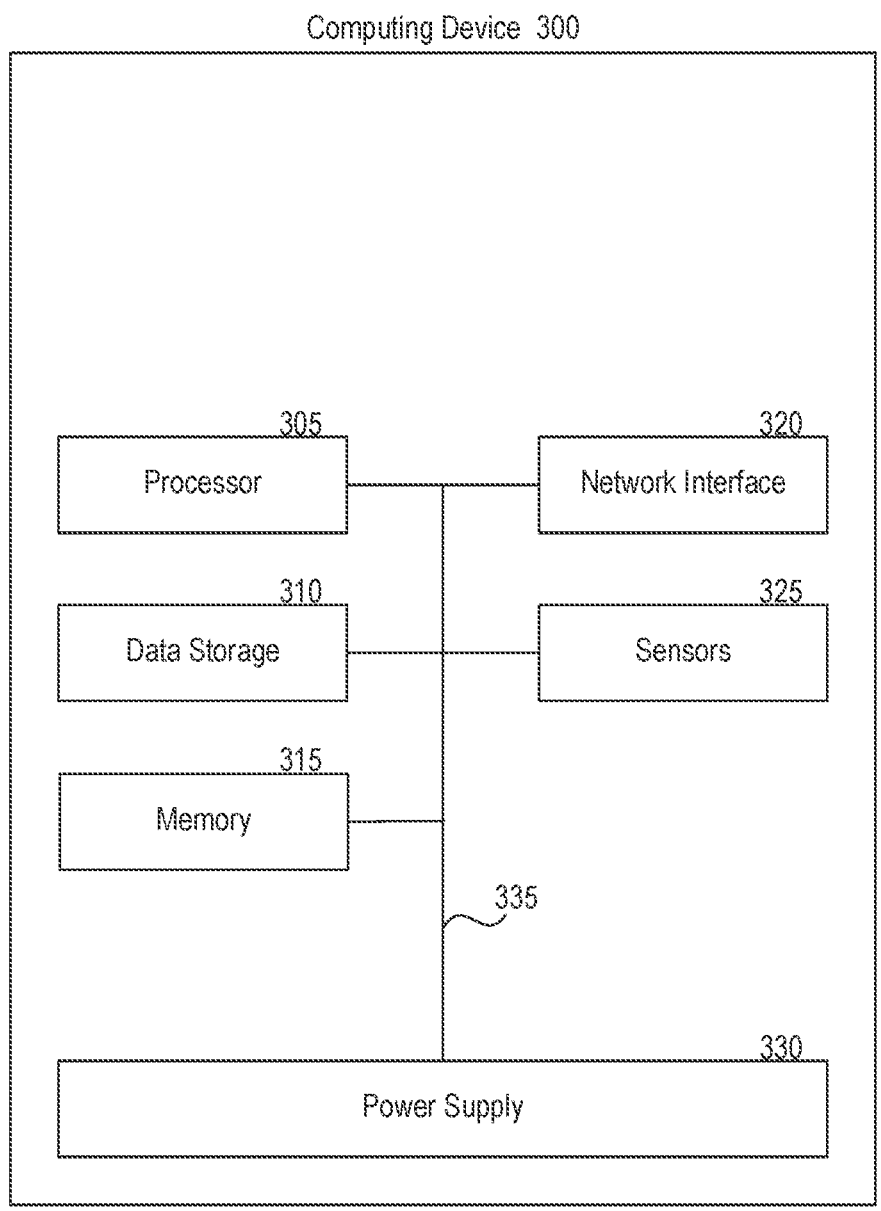
FIG. 3 is a block diagram of a representative computing device in which variable noise reduction systems configured in accordance with embodiments of the present technology can operate.

FIG. 3 is a block diagram of a representative computing device 300 on which aspects of the variable noise reduction systems can be implemented. The computing device 300 can be part of a supersonic commercial aircraft's onboard computing system (e.g., the control system 106), can be located at a ground-based flight controller, can be part of a cloud computing platform or cluster, and/or can be located in a data center or other suitable location. The computing device 300 typically includes a processor 305 for executing processing instructions, a data storage medium component 310 (e.g., hard drive, flash memory, memory card), volatile memory and/or nonvolatile memory 315, network interface 320, and/or sensors 325. The sensors 325 can include pressure sensors, speed sensors, altimeters, compasses, gyroscopes, atmospheric sensors, and sensors associated with throttle position, thrust output, and/or the configuration and/or status of the flight control surfaces 102 (e.g., high-lift devices such as the slats 104 and the flaps 105). A power supply 330 provides the required power, and the various components of the computing device 300 can be interconnected via a bus 335.

The data storage medium component 310, and volatile and nonvolatile memory 315, generally store information such as processor-readable instructions, data structures, program modules, and/or other data. Some examples of information that may be stored include basic input/output systems (BIOS), operating systems, and applications. For example, they can store land and sea surface geospatial data, data on an aircraft's current or planned flight trajectory, atmospheric data, meteorological data, climate forecast models, and the like. The stored information can also include routines (e.g., schedules) for operating aspects of variable noise reduction systems configured in accordance with embodiments of the present technology (e.g., routines for varying the throttle or thrust output, routines for adjusting the positions of the flight control surfaces such as the slats 104 and/or the flaps 105, and/or routines for varying, adjusting, and/or otherwise controlling other aircraft systems and components associated with noise reduction). Accordingly, references to "schedules" herein can include, for example, the schedules of takeoff settings and/or the schedules of approach settings described below, and the schedules can be stored in data storage 310 and/or memory 315, and/or they can be imported to the data storage 310 and/or the memory 315 via the network interface 320 in communication with other data sources.

Variable Noise Reduction Systems and Methods

Figure 4:
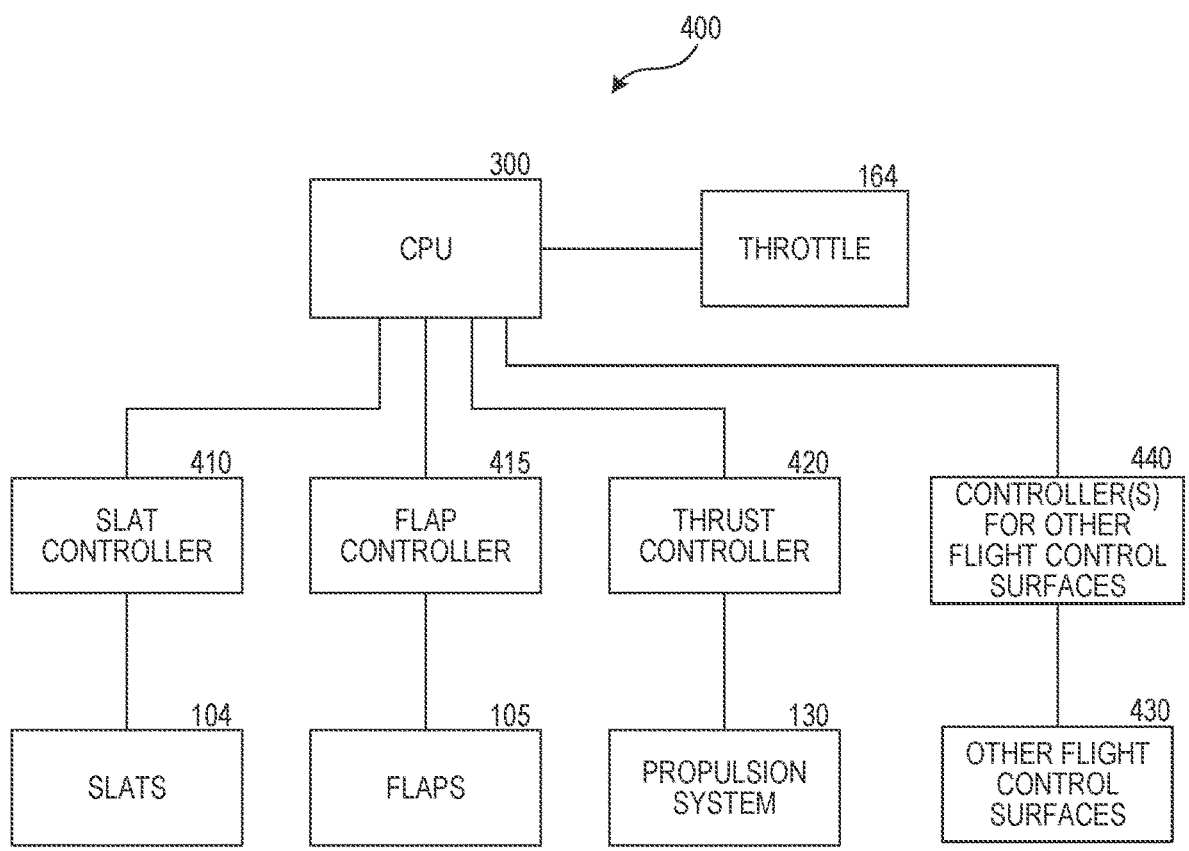
FIG. 4 is a schematic diagram of a variable noise reduction system configured in accordance with representative embodiments of the present technology.

FIG. 4 is a schematic diagram of a variable noise reduction system 400 configured in accordance with representative embodiments of the present technology. The system 400 can include the computing device 300 (or another suitable computing device), the throttle 164 (and/or a data connection to the throttle 164), one or more slat controllers 410, one or more flap controllers 415, and one or more thrust controllers 420. The slat controller(s) 410 are operably connected to the slats 104 to adjust the position of the slats 104 (e.g., to a stowed configuration, to a fully deployed configuration, or to a configuration between stowed and fully deployed) in response to commands from the computing device 300. The flap controller(s) 415 are operably connected to the flaps 105 to adjust the position of the flaps 105 (e.g., a stowed configuration, a fully deployed configuration, or a configuration between stowed and fully deployed) in response to commands from the computing device 300. The thrust controller(s) 420 are operably connected to the propulsion system 130 to adjust the thrust output of the propulsion system 130 in response to commands from the computing device 300. The throttle 164 is configured to receive input from an operator (e.g., a pilot) and to output information regarding a position of the throttle 164 to the computing device 300 regarding the operator's throttle commands.

Although the system 400 can include the components illustrated and described with regard to FIG. 4 for initial flight operations such as takeoff and climb, and/or for later flight operations such as approach and landing, the system 400 can include more or fewer components as necessary and/or suitable for other flight operations, such as cruising flight. In some embodiments, the system 400 can be part of, or operatively linked to, the control system 106 described above with regard to FIG. 1. Although some embodiments of the present technology rely on slats and/or flaps (and corresponding slat and flap controllers) to control the aircraft 100, in some embodiments, the system 400 can include other flight control surfaces 430 (which can include elevators, stabilizers, elevons, rudders, exhaust nozzle flaps, and/or other flight control surfaces) and corresponding controllers 440, in various suitable combinations. The computing device 300 can automatically control the various flight control surfaces 430 in manners similar to control of the slats 104 and/or flaps 105, to perform flight operations.

In a takeoff operation, at or near the threshold of the runway, a pilot adjusts the throttle 164 (see FIG. 2) to a selected position. In response to the throttle 164 being moved to the selected position, the system 400 (including the computing device 300) automatically varies the thrust output of the propulsion system 130 according to a pre-determined schedule associated with sufficient thrust for takeoff while controlling (e.g., minimizing) noise. The schedule of thrust output is described in further detail below with reference to FIG. 5. Accordingly, the selected position of the throttle 164 is not critical and can be any suitable position. For example, in some embodiments, the selected position can correspond to a position at which the propulsion system 130 would provide normal takeoff thrust if the system 400 was not following the schedule. In other embodiments, the selected position can correspond to a position at which the propulsion system 130 would provide maximum thrust if the system 400 was not following the schedule.

Despite the position of the throttle 164 providing a maximum thrust input, a normal takeoff thrust input, or another thrust input to the computing device 300, the computing device 300 may not instruct the thrust controller(s) 420 to adjust the thrust output of the propulsion system 130 to that level of thrust. Instead, the computing device 300 instructs the thrust controller(s) 420 to adjust the thrust output of the propulsion system 130 to a pre-determined level corresponding to a thrust level that is sufficient for takeoff (e.g., a thrust level that is sufficiently safe for ensuring takeoff), while controlling noise (e.g., minimizing noise). For example, the jet exhaust velocities of the engines may remain subsonic. Accordingly, although the pilot "requests" a thrust level by setting the throttle 164 to the selected position, the system 400 automatically provides the scheduled amount (e.g., a lesser amount) of thrust. The thrust propels the aircraft down the runway to take off and climb out.

To compensate for the reduced thrust provided by the system 400 during takeoff, the system 400 also automatically adjusts the configurations (e.g., positions) of the flight control surfaces 102 (e.g., the slats 104 and/or the flaps 105). Specifically, in response to the pilot adjusting the throttle 164 to the selected position (or in response to another signal identifying the beginning of the takeoff run), the computing device 300 instructs the slat controller(s) 410 and/or the flap controller(s) 415 to move the slats 104 and/or flaps 105 to suitable positions for segments of the takeoff and climb process. The system 400 automatically varies the configurations of the slats 104 and/or the flaps 105 according to a pre-determined schedule associated with sufficient lift for takeoff while controlling noise. For example, the system 400 can automatically vary the configurations of the slats 104 and/or the flaps 105 during the takeoff and climb process to compensate for the reduced thrust output of the propulsion system 130 described above, to maintain required (safe) climb rate and climb angle. In some embodiments, the positions of the control surfaces (e.g., the slats 104 and/or the flaps 105) in the schedule can be at least partially based on (e.g., a function of) the thrust output of the propulsion system 130 using known principles of flight and aerodynamics. In some embodiments, the positions of the control surfaces in the schedule can be determined empirically for a given location (e.g., airfield) and the environmental factors associated with that location (e.g., altitude, typical weather, acceptable noise levels). The schedule of configuration of the slats 104 and/or the flaps 105 is described in further detail below with reference to FIG. 5.

In a takeoff operation, therefore, the pilot needs only to adjust the throttle 164 to the selected position, which instructs the computing device 300 to carry out an automated takeoff and/or climb process by automatically adjusting the thrust of the propulsion system 130 and the configurations of the high-lift devices (e.g., the slats 104 and/or the flaps 105). The automation of the thrust and high-lift devices together allows the system 400 to comply with regulations associated with the permissible amount of human control during takeoff and climb for noise certification reference procedures. Such regulations generally prohibit human pilot input that decreases thrust or manually adjusts high-lift devices such as slats and flaps.

In some embodiments, the variable noise reduction system 400 can compensate for a failure of the propulsion system 130 (e.g., a failure of one or more engines). For example, the system 400 can include sensors or other devices to detect a failure of the propulsion system 130. In response to detecting a failure, the computing device 300 instructs the thrust controller(s) 420 to adjust the thrust output of the propulsion system 130 (e.g., the functioning engine or engines) to a pre-determined level corresponding to a thrust level that is sufficient for continuing takeoff, climb, cruise, approach, and/or landing, without considerations for controlling noise. Accordingly, in the event of a propulsion system 130 failure, the system 400 can prioritize flight safety without regard to minimizing noise.

Figure 5:
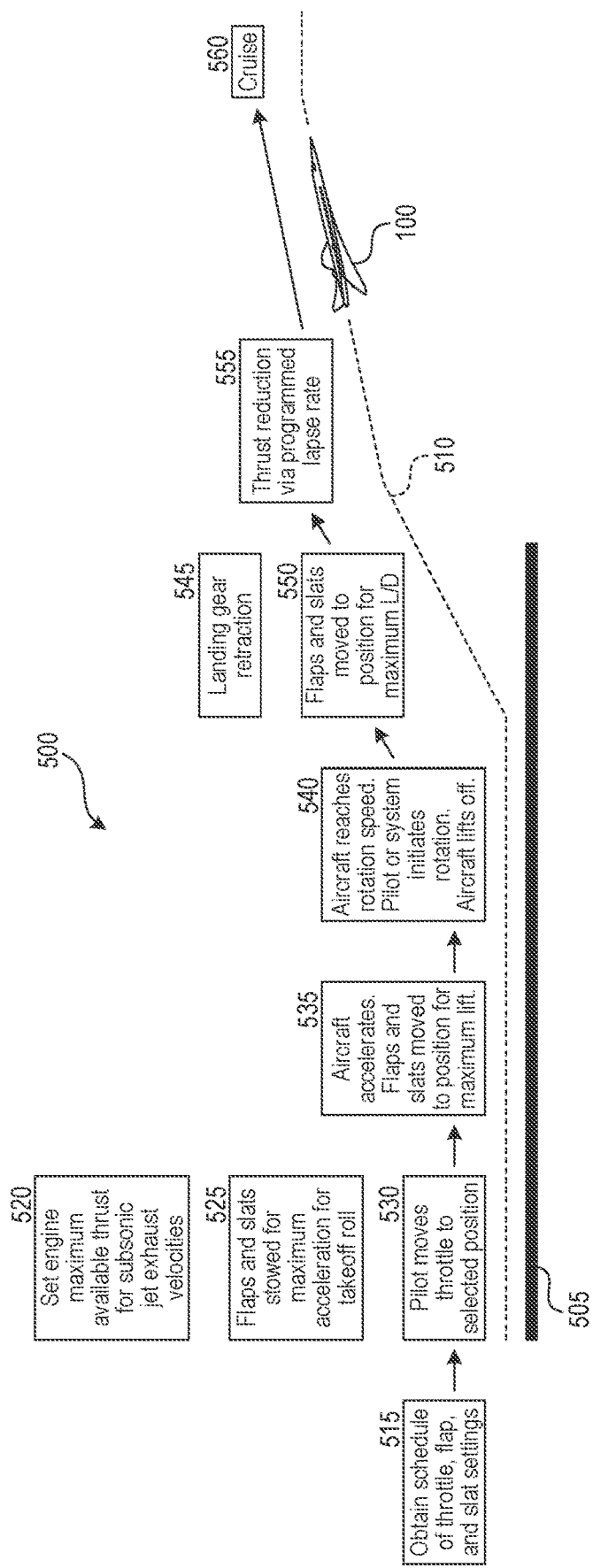
FIG. 5 is a pictorial flow chart of a method implemented by a variable noise reduction system configured in accordance with representative embodiments of the present technology, in which the system reduces noise during takeoff and climb.

FIG. 5 is a pictorial flow chart of a process or method 500 implemented by a variable noise reduction system (e.g., the system 400 described above with regard to FIG. 4) configured in accordance with representative embodiments of the present technology, in which the system reduces noise during acceleration, takeoff, and/or climb. For context, FIG. 5 illustrates the aircraft 100, a runway 505, and a takeoff and climb trajectory 510 of the aircraft 100. The takeoff and climb trajectory 510 is annotated with elements of the method 500. The method 500 can be implemented in the computing device 300, the system 400, and/or other controllers or devices programmed with takeoff instructions that, when executed, carry out some or all of the method 500.

The method 500 begins at block 515, where the system 400 obtains a schedule of settings of thrust (for the propulsion system 130) and settings for the flight control surfaces (e.g., the slats 104 and/or flaps 105) for acceleration, takeoff, and/or climb. For convenience, the schedule of settings for acceleration, takeoff, and/or climb can be referred to herein as a "schedule of takeoff settings." The schedule of takeoff settings may be pre-loaded into the computing device 300 (e.g., saved in data storage 310 and/or memory 315, see FIG. 3) and/or settings may be provided in real-time to the computing device 300 from a remote server storing the schedule (e.g., the settings can be provided and/or accessed in real-time when the system 400 needs them). In some embodiments, the schedule of takeoff settings includes an algorithm and/or a lookup table (or other collection of settings) in a database with specific takeoff settings (thrust, slat, and/or flap settings) according to the aircraft's airspeed, ground speed, altitude, orientation, and/or other characteristics. In some embodiments, the sensors 325 (see FIG. 3) provide signals to the processor 305 and/or other aspects of the computing device 300 (see FIG. 3) for the processor 305 and/or other aspects of the computing device 300 to determine appropriate settings for the thrust and the high-lift devices, based on the schedule of takeoff settings.

In some embodiments, the schedule of takeoff settings is pre-determined (for example, by aircraft operators or other parties) and programmed and/or stored in the system 400. The schedule of takeoff settings may be determined by evaluating and/or testing factors such as airport location (e.g., elevation, airport slope), headwind, aircraft weight, ambient temperature, and/or other performance factors, along with observed and/or predicted noise based on prior tests and/or analysis. The schedule of takeoff settings minimizes noise while enabling takeoff at specific airports and/or under specific conditions. The system 400 implements the schedule as the aircraft 100 moves along the trajectory 510 during takeoff and climb-out.

For example, at blocks 520 and 525, the system 400 adjusts the thrust and flight control surfaces according to the schedule of takeoff settings. At block 520, the system 400 limits the thrust controller(s) 420 to a maximum available thrust value for the propulsion system 130 to produce subsonic jet exhaust velocities during the takeoff roll, but which is sufficient for reaching rotation speed. The thrust value is in the schedule and correlates with factors such as the runway length. At block 525, the slats 104 and flaps 105 are stowed for maximum acceleration (minimum drag) for the takeoff roll. The system 400 can perform the steps described in connection with blocks 520 and 525 in any suitable sequence (e.g., limiting thrust then stowing control surfaces, or stowing control surfaces then limiting thrust) and/or simultaneously.

At block 530, the pilot moves the throttle 164 to the selected position to signal the system 400 to begin the takeoff process. In some embodiments, the pilot can move the throttle 164 prior to, or concurrently with, the prior steps associated with obtaining settings and setting the thrust and control surfaces (e.g., the high-lift devices). Even if the pilot requests full thrust with the throttle 164, the system 400 limits the thrust to the thrust value specified by the schedule.

Next, at block 535, the aircraft 100 accelerates along the runway 505 in an acceleration phase of the takeoff process. As the aircraft accelerates along the runway 505, the system 400 senses aircraft speed using one or more of the sensors 325 (see FIG. 3), which may include airspeed sensors (such as pitot tubes), ground speed sensors (such as nose wheel speed sensors), global positioning system sensors, and/or other sensors suitable for detecting aircraft speed. Just prior to, or concurrent with reaching rotation speed, the system 400 instructs the slat and flap controllers (410, 415, see FIG. 4) to move the slats 104 and flaps 105 to a configuration associated with maximum lift (e.g., greater than a preset lift value) and/or to another configuration suitable for rotation of the aircraft when it reaches rotation speed. Then, at block 540, the aircraft reaches rotation speed and the pilot or the system 400 initiates rotation and the aircraft lifts off. In some embodiments, in response to a sensor reporting that the aircraft 100 has reached rotation speed, the system 400 instructs the slat and flap controllers 410, 415 to briefly move to a configuration that assists with the rotation. The rotation speed can be determined through analysis and flight testing for each specific aircraft.

Next, when the aircraft 100 is airborne, at block 545, the pilot or the system 400 can initiate landing gear retraction (for example, at approximately 35 feet of altitude or another suitable altitude). At block 550, according to the schedule, the system 400 instructs the slat and flap controllers (410, 415, see FIG. 4) to move the slats 104 and flaps 105 to a position corresponding to maximum L/D (lift over drag) (e.g., greater than a preset value of L/D) while maintaining climb-out speed and climb gradient in a climb phase of the takeoff process. The system 400 can move the slats 104 and flaps 105 to maximum L/D position before, during, or after landing gear retraction.

The aircraft 100 continues to climb after block 550. Next, to continue controlling (e.g., minimizing) noise, at block 555, the system 400 begins reducing the thrust according to a programmed lapse rate. The lapse rate is part of the schedule of thrust and can be pre-determined based on testing at various airports and under various conditions. Next, at block 560, the aircraft 100 reaches cruise altitude, where the pilot can take over more control of the thrust and/or lift devices, and/or an autopilot system may take over flight toward the destination.

In some embodiments, there may be an additional pilot-initiated and/or automated throttle cutback after the programmed lapse rate once the aircraft reaches sufficient altitude (e.g., above 900 feet or another suitable altitude) that further reduces noise away from the airport. Current noise regulations and airport noise abatement procedures allow this. In some embodiments, the cutback can also be programmed (e.g., scheduled) for specific airports.

In some embodiments, adjusting the flight control surfaces includes adjusting one or more elevators and/or stabilizers in tandem with controlling the flaps 105 and/or the slats 104 to trim out pitching motion associated with changing the configuration of the flaps 105 and/or the slats 104. In some embodiments, the method can include adjustment of the thrust output and/or the flight control surfaces for only a portion of the takeoff and/or climb process. Accordingly, the method can include adjustment of the thrust output and/or the flight control surfaces during the acceleration phase, the rotation phase, the climb phase, and/or other phases of flight.

Figure 6:
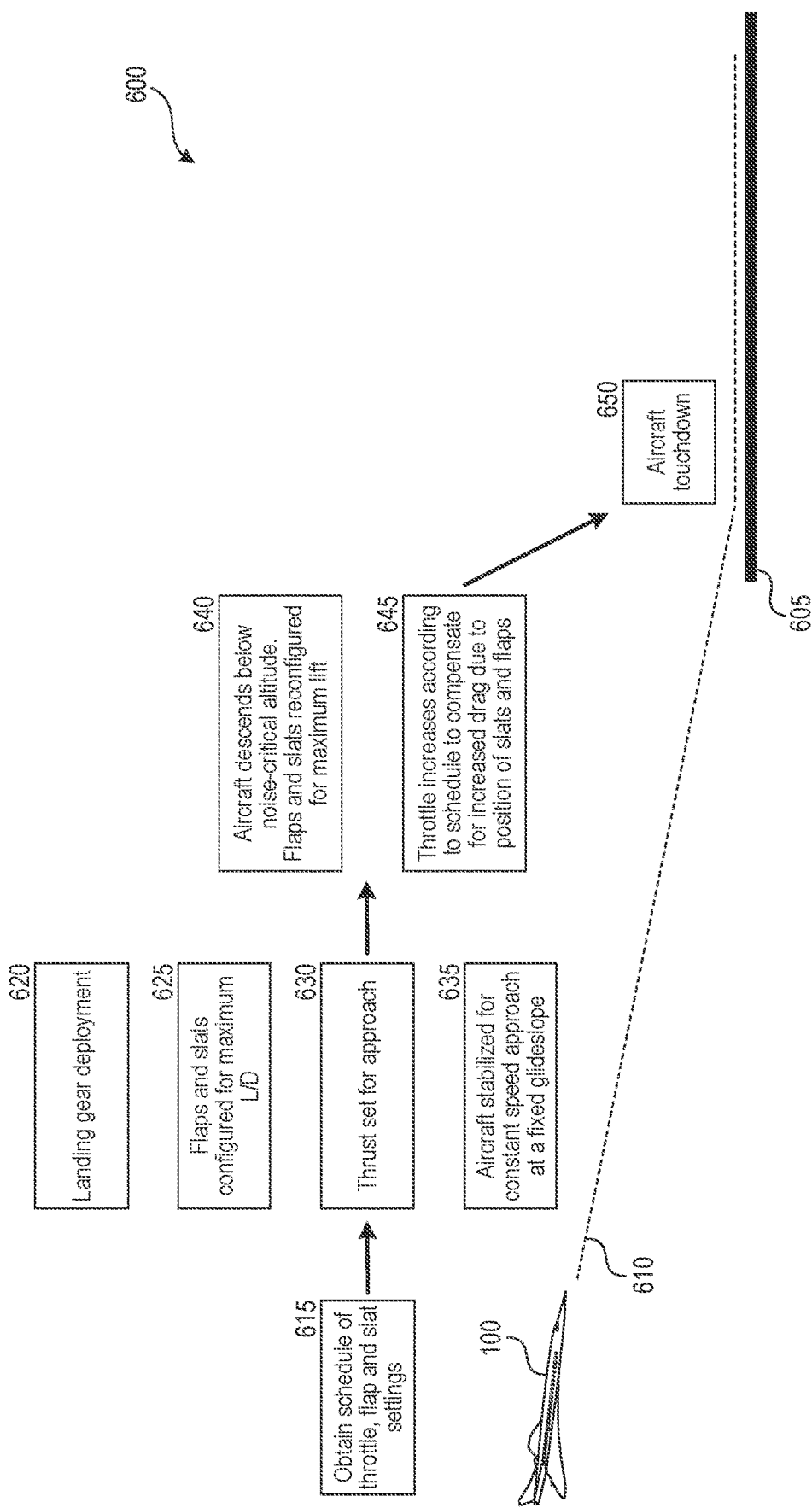
FIG. 6 is a pictorial flow chart of a method implemented by a variable noise reduction system configured in accordance with representative embodiments of the present technology, in which the system reduces noise during approach and/or landing.

FIG. 6 is a pictorial flow chart of a process or method 600 implemented by a variable noise reduction system (e.g., the system 400 described above with regard to FIG. 4) configured in accordance with representative embodiments of the present technology, in which the system 400 reduces noise during approach and/or landing. For context, FIG. 6 illustrates the aircraft 100, a runway 605, and an approach and landing trajectory 610 of the aircraft 100. The approach and landing trajectory 610 is annotated with elements of the method 600. The method 600 can be implemented in the computing device 300 and/or the system 400 programmed with approach instructions that, when executed, carry out some or all of the method 600.

The method 600 begins at block 615, where the system 400 obtains a schedule of settings of thrust (for the propulsion system 130) and settings for the flight control surfaces (e.g., the slats 104 and flaps 105) for approach and/or landing. For convenience, the schedule of settings for approach and/or landing can be referred to herein as a "schedule of approach settings." The schedule of approach settings may be pre-loaded into the computing device 300 (e.g., saved in data storage 310 and/or memory 315, see FIG. 3), and/or settings may be delivered in real-time to the computing device 300 from a remote computing system (e.g., the settings can be provided and/or accessed in real-time when the system 400 requests them from a remote computing system or other location). In some embodiments, the schedule of approach settings includes an algorithm and/or a lookup table (or other collection of settings) in a database with specific approach settings (thrust, slat, and/or flap settings) according to the aircraft's airspeed, ground speed, altitude, orientation, and/or other characteristics. In some embodiments, the sensors 325 (see FIG. 3) provide signals to the processor 305 and/or other aspects of the computing device 300 (see FIG. 3) for the processor 305 and/or other aspects of the computing device 300 to determine appropriate settings for the thrust and the high-lift devices, based on the approach schedule.

In some embodiments, the schedule of approach settings is pre-determined (for example by aircraft operators and/or other parties) and programmed and/or stored in the system 400. The schedule of approach settings may be determined by evaluating and/or testing factors such as airport location (e.g., elevation, airport slope), headwind, aircraft weight, ambient temperature, and/or other performance factors, along with observed and/or predicted noise based on prior tests and/or analysis. The schedule of approach settings reduces (e.g., minimizes) noise while enabling landing at specific airports and/or under specific conditions. The system 400 implements the schedule as the aircraft 100 moves along the trajectory 610 during approach and landing.

At an early stage of an approach and landing process, in block 620, a pilot or other operator deploys the landing gear from the aircraft 100. Landing gear deployment (block 620) can occur at any suitable phase of the approach and landing process.

After, and/or concurrently with, obtaining the schedule of approach settings in block 615, the system 400 adjusts the flight control surfaces and the thrust as generally illustrated in blocks 625 and 630, according to the approach schedule. In some embodiments, in block 625, the system 400 configures the control surfaces (e.g., flaps 105 and slats 104) with deflection angles that result in a maximum L/D value (e.g., a value of L/D that is greater than a preset value) to facilitate noise reduction. For example, the system 400 can configure the control surfaces to cause the aircraft 100 to have a selected value of L/D that corresponds with a permissible noise level for that location, according to regulations or other limitations.

In some embodiments, before, after, and/or concurrently with adjustment of the flaps 105 and/or slats 104, at block 630, the system 400 sets the thrust output to compensate for the high L/D configuration of the flaps and slats. In some embodiments, the system 400 adjusts the flaps 105 and/or the slats 104 in response to (e.g., based on) the throttle settings and/or thrust output. At block 635, after the flaps, slats, and thrust output are in the high (e.g., maximum) L/D configuration, the aircraft stabilizes for a constant speed approach at a fixed glideslope, while the flaps, slats, and thrust settings collectively result in reduced noise output for the approach. The approach schedule and the settings of flaps, slats, and thrust can be pre-determined using empirical and/or analytical (e.g., mathematical) methods. In a specific non-limiting example, operators can position a microphone 394 feet below the aircraft when it is on a 3-degree approach glideslope to measure noise and determine optimal settings for the approach schedule. Because approach and landing typically involve subsonic speeds, the thrust output can inherently be subsonic during approach and landing.

Next, the aircraft 100 continues to descend. At block 640, the aircraft 100 descends to and/or below an altitude at which the approach noise is acceptable. Such an altitude can be an altitude at which the noise does not irritate or cause other problems for the airport's nearby regions. For example, the altitude can be where noise measurements meet noise regulations. Upon reaching the altitude for acceptable noise, the system 400 repositions the control surfaces (e.g., flaps 105 and slats 104) according to the schedule of approach settings to generate a maximum lift coefficient (e.g., a value that is greater than a preset value), which can reduce the required length of the landing field. In a non-limiting example, an altitude at which the system 400 can reconfigure the control surfaces (e.g., an altitude at which the noise level is acceptable), can be within a range of 350 feet to 380 feet, or other suitable altitudes. In some embodiments, the altitude in block 640 for the change in the high lift devices can be set to comply with noise certification standards, which may dictate that no changes in control surface positions and/or thrust are allowed during the approach noise event (e.g., when the aircraft is between 100 and 500 feet above ground level, such as between 470 and 370 feet above ground level, or at other altitudes).

Next, at block 645, the system 400 adjusts the throttle according to the approach schedule to increase the thrust to compensate for the additional drag from the configuration of the control surfaces in block 640 (e.g., flaps 105 and slats 104). For example, the system 400 can adjust the throttle at least partially based on the configurations (e.g., positions) of the control surfaces and/or at least partially based on empirical data gathered for a particular location (e.g., airfield). The system 400 maintains a constant airspeed and glideslope during the slat, flap, and throttle changes in blocks 640 and 645. In some embodiments, the system 400 adjusts the throttle simultaneously with the adjustment of the slats 104 and flaps 105. Then, at box 650, the aircraft 100 touches down and the pilot and/or the system 400 performs conventional post-touchdown procedures (e.g., braking, taxiing, etc.).

Although several embodiments described above include controlling flaps and slats as high-lift devices, variable noise reduction systems configured in accordance with other embodiments of the present technology may perform the same or similar functions and methods using other flight control surfaces (aerodynamic control devices), including aerodynamic control devices that are not necessarily high-lift devices. Accordingly, embodiments of the present technology generally include systems and methods that automatically vary engine throttle and aerodynamic control surfaces during takeoff and climb of a supersonic aircraft and/or during approach to reduce (e.g., minimize) aircraft noise. For example, embodiments of the present technology can include a tailless delta wing aircraft, and the system 400 can control elevons instead of flaps (or the flaps of the aircraft may not necessarily be high-lift devices, and the flaps may also be used as elevons). Such systems can further include corresponding controllers for each aerodynamic control device, the corresponding controllers being responsive to commands from the computing device 300 (see FIG. 4). Accordingly, embodiments of the present technology include operating any flight control surface according to a schedule.

FIG. 7 illustrates a schedule 700 of settings configured in accordance with representative embodiments of the present technology. The schedule 700 can include a schedule of takeoff settings 710 and/or a schedule of approach settings 720. In some embodiments, each takeoff and/or landing location (e.g., airfield) can have its own schedule 700. The schedule 700 can include schedules of settings (e.g., positions) for slats, flaps, and/or other control surfaces, and/or throttle settings (e.g., thrust output) for a given altitude, airspeed, time of flight, and/or other suitable characteristics that may be determined empirically and/or analytically, as described above. The system 400 can implement the values in the schedule 700 to provide noise reduction during takeoff, climb, approach, and/or landing. Although a table is shown in FIG. 7, the illustration in FIG. 7 is for example only, and the schedule 700 can have any other form suitable for storing information, such as a graph, a function, algorithm, and/or any other suitable database, data structure, etc., that is storable in the memory 315 and/or the data storage 310 and accessible by the computing device 300.

CONCLUSION

The disclosed technology involves minimal pilot input to facilitate supersonic commercial aircraft takeoff and/or landing (e.g., the approach portion of a landing process) with reduced (e.g. minimized) acoustic footprint. In some embodiments, the pilot only moves the throttle 164 to a nominal position (e.g., "requesting" adequate thrust for safe takeoff and climb-out) and retracts the landing gear. Otherwise, the method 500 involves the system 400 performing automatic variable noise reduction. The schedule of thrust and flight control surface settings for takeoff and approach can be pre-determined through testing and analysis. Representative systems can adjust the propulsion system according to the schedule in a manner that limits the thrust output to below supersonic levels and/or to otherwise reduce noise, and the systems can compensate for the reduced thrust by adjusting the flight control surfaces (e.g., high-lift devices) accordingly, to maintain a safe and appropriate climb rate and/or a safe and appropriate descent/approach rate.

Accordingly, the systems can automatically balance noise abatement (reduced thrust) and rate of altitude change by following the one or more schedules programmed into the systems. The systems can advantageously provide the ability for commercial operators to operate a supersonic aircraft at commercial airports, by producing less takeoff noise and/or approach noise than conventional supersonic-capable aircraft. The systems can also advantageously comply with regulations associated with computer-controlled takeoff and/or landing of aircraft.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

The above detailed description of implementations of the systems is not intended to be exhaustive or to limit the systems to the precise forms disclosed above. While specific implementations of, and examples for, the systems are described above for illustrative purposes, various equivalent modifications are possible within the scope of the systems, as those skilled in the relevant art will recognize. For example, some network elements are described herein as performing certain functions. Those functions can be performed by other elements in the same or differing networks, which can reduce the number of network elements. Alternatively, or additionally, network elements performing those functions can be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks, and acts of the various implementations described above can be combined to provide further implementations.

From the foregoing, it will be appreciated that specific embodiments of the disclosed technology have been described herein for purposes of illustration, but that various modifications may be made without deviating from the technology. For example, the disclosed technology may be implemented in a fully autonomous aircraft or a remotely-controlled aircraft, and aspects that involve pilot control may be automated and/or remotely controlled. In some embodiments, a pilot may disable some or all of the systems disclosed herein to take manual control (for example, in emergencies or in the event of a failure, such as engine failure or failure of systems associated with the high-lift devices). In some embodiments, the pilot can have access to maximum thrust at any time during operation of the aircraft for emergency or other purposes. Generally, a pilot can override any aspect of the systems and methods herein. In some embodiments, the throttle 164 can include a pilot override feature. For example, in some embodiments, the system 400 can include a blocking element (such as a mechanical detent or digital limiter) that blocks the pilot from moving the throttle 164 beyond the selected position that initiates the thrust schedule. In an emergency or other relevant situation, the pilot can bypass the blocking element to access more thrust than the amount of scheduled thrust. Certain aspects of the technology described in the context of particular embodiments may be combined or eliminated in other embodiments. For example, systems (e.g., the system 400) configured in accordance with embodiments of the present technology can include a takeoff system only, a landing system only, and/or a combined system that includes noise reduction for both takeoff and landing.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated. To the extent any materials incorporated herein by reference conflict with the present disclosure, the present disclosure controls.

Several additional aspects and/or embodiments of the present technology are set forth in the following examples, which can be combined with each other:

1. A noise reduction system for supersonic aircraft as disclosed herein.
2. A method for reducing noise from supersonic aircraft as disclosed herein.
3. A supersonic aircraft take-off system comprising:
    a computing device;
    a throttle configured to receive input from an operator and to output information regarding a position of the throttle to the computing device;
    a thrust controller operably connected to the computing device and configured to adjust the thrust output of a propulsion system in response to thrust commands from the computing device;
    a slat controller configured to adjust a position of one or more slats in response to slat commands from the computing device; and
    a flap controller configured to adjust a position of one or more flaps in response to flap commands from the computing device; wherein
    the computing device is programmed with instructions that, when executed:
        adjust the thrust output of the propulsion system to a subsonic exhaust velocity;
        vary the thrust output according to a schedule of thrust output, while maintaining the thrust output below supersonic exhaust velocities, during an acceleration phase of a takeoff process, during a rotation phase of a takeoff process, and during a climb phase of a takeoff process;
        adjust the position of the one or more slats according to a schedule of slat positions to compensate for the thrust output of the propulsion system; and
        adjust the position of the one or more flaps according to a schedule of flap positions to compensate for the thrust output of the propulsion system.
4. A supersonic aircraft landing system comprising:
    a computing device;
    a throttle configured to receive input from an operator and to output information regarding a position of the throttle to the computing device;
    a thrust controller operably connected to the computing device and configured to adjust the thrust output of a propulsion system in response to thrust commands from the computing device;
    a slat controller configured to adjust a position of one or more slats in response to slat commands from the computing device; and
    a flap controller configured to adjust a position of one or more flaps in response to flap commands from the computing device; wherein
    the computing device is programmed with instructions that, when executed:
        adjust the position of the one or more slats according to a schedule of slat positions to increase L/D (e.g., maximize L/D);
        adjust the position of the one or more flaps according to a schedule of flap positions to increase L/D (e.g., maximize L/D);
        when the aircraft is at or below a selected altitude, adjust the position of the one or more slats according to a schedule of slat positions to increase lift (e.g., maximize lift);
        when the aircraft is at or below a selected altitude, adjust the position of the one or more flaps according to a schedule of flap positions to increase lift (e.g., maximize lift); and
        adjust the thrust output of the propulsion system in response to changes in the configurations of the slats and/or flaps.
5. A supersonic aircraft noise reduction system comprising:
    a computing device;
    a throttle configured to receive input from an operator and to output information regarding a position of the throttle to the computing device;
    a thrust controller operably connected to the computing device and configured to adjust the thrust output of a propulsion system in response to thrust commands from the computing device;
    a slat controller configured to adjust a position of one or more slats in response to slat commands from the computing device; and
    a flap controller configured to adjust a position of one or more flaps in response to flap commands from the computing device; wherein
    the computing device is programmed with instructions that, when executed:
        adjust the thrust output of the propulsion system, the positions of the one or more slats, and the positions of the one or more flaps according to a schedule of takeoff settings; and
        adjust the thrust output of the propulsion system, the positions of the one or more slats, and the positions of the one or more flaps according to a schedule of approach settings;
    wherein adjusting the thrust output of the propulsion system, the positions of the one or more slats, and the positions of the one or more flaps according to a schedule of takeoff settings comprises:
        adjusting the thrust output of the propulsion system to a subsonic exhaust velocity;
        varying the thrust output according to the schedule of takeoff settings, while maintaining the thrust output below supersonic exhaust velocities, during an acceleration phase of a takeoff process, during a rotation phase of a takeoff process, and/or during a climb phase of a takeoff process;
        adjusting the position of the one or more slats according to a schedule of slat positions to compensate for the thrust output of the propulsion system; and adjusting the position of the one or more flaps according to a schedule of flap positions to compensate for the thrust output of the propulsion system; and wherein adjusting the thrust output of the propulsion system, the positions of the one or more slats, and the positions of the one or more flaps according to a schedule of approach settings comprises:

adjusting the position of the one or more slats according to a schedule of slat positions to increase L/D (e.g., maximize L/D);

adjusting the position of the one or more flaps according to a schedule of flap positions to increase L/D (e.g., maximize L/D);

when the aircraft is at or below a selected altitude, adjust the position of the one or more slats according to a schedule of slat positions to increase lift (e.g., maximize lift);

when the aircraft is at or below a selected altitude, adjust the position of the one or more flaps according to a schedule of flap positions to increase lift (e.g., maximize lift); and adjusting the thrust output of the propulsion system in response to changes in the configurations of the slats and/or flaps.

6. The system of example 3, example 4, or example 5, further comprising the aircraft, wherein the aircraft comprises the flaps, the slats, and the propulsion system.

7. The system of any one of examples 3-6, wherein the propulsion system is a jet propulsion system.

8. A method, performed by a computing system, to control noise during takeoff of a supersonic aircraft, the method comprising:

obtaining a schedule of settings of thrust, slat positions, and flap positions for a takeoff procedure;

receiving an instruction from a throttle regarding a requested thrust output for a propulsion system for the aircraft;

setting flaps and slats in stowed configurations;

setting the thrust output to a level below the requested thrust output to cause the aircraft to accelerate along a runway, wherein the thrust output results in subsonic exhaust velocity;

upon reaching rotation speed, positioning (e.g., deploying) the flaps and slats according to the schedule;

upon rotation and liftoff of the aircraft, moving the flaps and slats according to the schedule; and varying the thrust output according to a programmed lapse rate in the schedule.

9. A method, performed by a computing system, to control noise during approach for landing of a supersonic aircraft, the method comprising:

obtaining a schedule of settings of thrust, slat positions, and flap positions for a landing procedure;

setting flaps and slats in a configuration for L/D above a preset value of L/D (e.g., maximum L/D);

setting thrust output of a propulsion system to compensate for the configuration of the flaps and slats while minimizing noise and maintaining approach speed and glideslope;

descending the aircraft below a selected altitude;

after descending the aircraft below the selected altitude, reconfiguring the flaps and slats for a lift value that is above a preset lift value (e.g., maximum lift); and after descending the aircraft below the selected altitude, increasing the thrust output to compensate for the reconfiguration of the flaps and slats.

10. A supersonic aircraft take-off system comprising:
a computing device;
a throttle configured to receive input from an operator and to output information regarding a position of the throttle to the computing device;
a thrust controller operably connected to the computing device and configured to adjust the thrust output of a propulsion system in response to thrust commands from the computing device; and
a flight control surface controller configured to adjust a position of one or more flight control surfaces in response to flight control surface commands from the computing device; wherein
the computing device is programmed with instructions that, when executed:
 adjust the thrust output of the propulsion system to a subsonic exhaust velocity;
 vary the thrust output according to a schedule of thrust output, while maintaining the thrust output below supersonic exhaust velocities, during an acceleration phase of a takeoff process, during a rotation phase of a takeoff process, and/or during a climb phase of a takeoff process; and
 adjust the position of the one or more flight control surfaces according to a schedule of flight control surface positions to compensate for the thrust output of the propulsion system.

11. A supersonic aircraft landing system comprising:
a computing device;
a throttle configured to receive input from an operator and to output information regarding a position of the throttle to the computing device;
a thrust controller operably connected to the computing device and configured to adjust the thrust output of a propulsion system in response to thrust commands from the computing device; and
a flight control surface controller configured to adjust a position of one or more flight control surfaces in response to flight control surface commands from the computing device; wherein
the computing device is programmed with instructions that, when executed:
 adjust the position of the one or more flight control surfaces according to a schedule of flight control surface positions that includes an L/D configuration above a preset L/D value (e.g., maximum L/D configuration) when the aircraft is above a selected altitude and a lift configuration above a preset lift value (e.g., maximum lift configuration) when the aircraft is below the selected altitude; and
 vary the thrust output to compensate for the configurations of the flight control surfaces to maintain airspeed and glideslope on approach.

12. The system of example 10 or 11, further comprising the aircraft, wherein the aircraft comprises the one or more flight control surfaces and the propulsion system.

13. The system of example 12, wherein the propulsion system is a jet propulsion system.

14. The system of example 10 or 11, wherein the one or more flight control surfaces include elevators, stabilizers, elevons, slats, flaps, and/or other flight control surfaces.

15. A method, performed by a computing system, to control noise during takeoff of a supersonic aircraft, the method comprising:
obtaining a schedule of settings of thrust and flight control surface positions for a takeoff procedure;
receiving an instruction from a throttle regarding a requested thrust output for a propulsion system for the aircraft;
setting the thrust output to a level below the requested thrust output to cause the aircraft to accelerate along a runway, wherein the thrust output results in subsonic exhaust velocity;
upon reaching rotation speed, operating the one or more flight control surfaces according to the schedule;
upon rotation and liftoff of the aircraft, moving the one or more flight control surfaces according to the schedule; and
varying the thrust output according to a programmed lapse rate in the schedule.

16. A method, performed by a computing system, to control noise during landing of a supersonic aircraft, the method comprising:
obtaining a schedule of settings of thrust and flight control surface positions for an approach procedure;
above a selected altitude, operating the one or more flight control surfaces according to the schedule, to provide L/D above a preset L/D value (e.g., maximum L/D);
below a selected altitude, operating the one or more flight control surfaces according to the schedule, to provide lift over a preset lift value (e.g., maximum lift); and
setting the thrust output to compensate for the positions of the flight control surfaces.

We claim:

1. A system for reducing noise of a supersonic aircraft, the system comprising:
a computing device;
a thrust controller operably connected to the computing device and configured to adjust a thrust output of a propulsion system in response to thrust commands from the computing device; and
a flight control surface controller configured to adjust a position of one or more flight control surfaces in response to flight control surface commands from the computing device; wherein
(i) the computing device is programmed with takeoff instructions that, when executed:
adjust the thrust output of the propulsion system to a subsonic exhaust velocity;
vary the thrust output according to a first schedule of thrust output, while maintaining the thrust output below supersonic exhaust velocities, during an acceleration phase of a takeoff process, during a rotation phase of a takeoff process, and/or during a climb phase of a takeoff process; and
adjust the position of the one or more flight control surfaces according to a first schedule of flight control surface positions; and wherein
(ii) the computing device is programmed with approach instructions that, when executed:
vary the thrust output based on a second schedule of thrust output; and
adjust the position of the one or more flight control surfaces according to a second schedule of flight control surface positions, wherein adjusting the position of the one or more flight control surfaces according to the second schedule of flight control surface positions comprises:
(a) when the aircraft is above a selected altitude, positioning the one or more flight control surfaces to cause the aircraft to have a selected value of lift over drag that corresponds with a permissible noise level at a landing location; and
(b) when the aircraft is below the selected altitude, positioning the one or more flight control surfaces to increase lift of the aircraft without regard to a noise level of the aircraft.

2. The system of claim 1, further comprising a throttle operably coupled to the propulsion system, wherein the throttle is configured to receive input from an operator and to output information regarding a position of the throttle to the computing device.

3. The system of claim 1, further comprising the supersonic aircraft.

4. The system of claim 1, wherein the propulsion system comprises a jet propulsion system.

5. The system of claim 1, wherein the one or more flight control surfaces comprises a plurality of flaps and/or a plurality of slats.

6. The system of claim 1, wherein the one or more flight control surfaces comprises at least one of an elevator, a stabilizer, or an elevon.

7. A method, performed by a computing system, to control noise during operation of a supersonic aircraft, the method comprising:
obtaining a schedule of takeoff settings for thrust and flight control surface positions for a takeoff procedure;
receiving an instruction from a throttle regarding a requested takeoff thrust output for a propulsion system of the aircraft;
setting flaps and/or slats of the aircraft in stowed configurations;
setting a thrust output according to the schedule of takeoff settings to a level below the requested takeoff thrust output to cause the aircraft to accelerate along a runway, wherein the thrust output results in subsonic exhaust velocity from the propulsion system;
upon reaching rotation speed, positioning the flaps and/or slats according to the schedule of takeoff settings;
upon rotation and liftoff of the aircraft, moving the flaps and/or slats according to the schedule of takeoff settings;
varying the thrust output according to a programmed lapse rate in the schedule of takeoff settings;
obtaining a schedule of approach settings for thrust and flight control surface positions for an approach procedure;
above a selected altitude, positioning the flaps and/or slats according to the schedule of approach settings, to cause the aircraft to have a selected value of lift over drag that is above a preset value of lift over drag, and setting the thrust output to compensate for the positioning of the flaps and/or slats; and
at or below the selected altitude, positioning the flaps and/or slats according to the schedule of approach settings, to cause the aircraft to have a lift value that is above a preset value of lift, and setting the thrust output to compensate for the positioning of the flaps and/or slats.

8. The method of claim 7, wherein obtaining the schedule of takeoff settings comprises receiving the schedule of takeoff settings in a memory of the computing system.

9. The method of claim 7, wherein obtaining the schedule of takeoff settings comprises obtaining a schedule of settings for at least one of an elevator, a stabilizer, or an elevon.

10. The method of claim 7, wherein obtaining the schedule of approach settings for thrust and flight control surface positions comprises receiving the schedule of approach settings in a memory of the computing system.

11. The method of claim 10, wherein obtaining the schedule of approach settings comprises obtaining a schedule of approach settings for at least one of an elevator, a stabilizer, or an elevon.

12. A system for reducing noise of a supersonic aircraft, the system comprising:
a computing device;
a thrust controller operably connected to the computing device and configured to adjust a thrust output of a propulsion system in response to thrust commands from the computing device; and
a flight control surface controller configured to adjust a position of one or more flight control surfaces in response to flight control surface commands from the computing device; wherein
the computing device is programmed with approach instructions that, when executed:
adjust the position of the one or more flight control surfaces according to a schedule of flight control surface positions, wherein adjusting the position of the one or more flight control surfaces comprises:
(a) when the aircraft is above a selected altitude, positioning the one or more flight control surfaces to cause the aircraft to have a selected value of lift over drag; and
(b) when the aircraft is below the selected altitude, positioning the one or more flight control surfaces to increase lift of the aircraft; and
vary the thrust output to compensate for the positioning of the one or more flight control surfaces.

13. The system of claim 12, wherein the schedule of flight control surface positions is a first schedule of flight control surface positions, and wherein the computing device is further programmed with takeoff instructions that, when executed:
adjust the thrust output of the propulsion system to a subsonic exhaust velocity;
vary the thrust output according to a schedule of thrust output, while maintaining the thrust output below supersonic exhaust velocities, during an acceleration phase of a takeoff process, during a rotation phase of a takeoff process, and/or during a climb phase of a takeoff process; and
adjust the position of the one or more flight control surfaces according to a second schedule of flight control surface positions.

14. The system of claim 12, further comprising the supersonic aircraft.

15. The system of claim 12, wherein the propulsion system comprises a jet propulsion system.

16. The system of claim 12, wherein the one or more flight control surfaces comprises a plurality of flaps and a plurality of slats.

17. The system of claim 12, wherein the one or more flight control surfaces comprises at least one of an elevator, a stabilizer, or an elevon.

18. A method, performed by a computing system, to control noise during landing of a supersonic aircraft, the method comprising:
obtaining a schedule of approach settings for thrust and flight control surface positions for an approach procedure;
above a selected altitude, positioning one or more flight control surfaces according to the schedule of approach settings, to cause the aircraft to have a selected value of lift over drag that is greater than a preset value of lift over drag, and setting a thrust output from a propulsion system to compensate for the positioning of the one or more flight control surfaces; and
at or below the selected altitude, positioning the one or more flight control surfaces according to the schedule of approach settings, to cause the aircraft to have a selected lift value that is greater than a preset value of lift, and setting a thrust output from the propulsion system to compensate for the positioning of the one or more flight control surfaces.

* * * * *